United States Patent [19]

Almquist et al.

[11] Patent Number: 5,094,423
[45] Date of Patent: Mar. 10, 1992

[54] TRAILER SECURITY DEVICE AND METHOD

[75] Inventors: Gary S. Almquist; Robert V. Moss, both of Burnsville; Kenneth A. King, Hastings, all of Minn.

[73] Assignee: Kinquist Corporation, Burnsville, Minn.

[21] Appl. No.: 586,679

[22] Filed: Sep. 24, 1990

[51] Int. Cl.$^5$ ............................................. F16M 13/00
[52] U.S. Cl. ........................................ 248/552; 70/58; 248/156; 248/352
[58] Field of Search ............... 248/551, 552, 553, 352, 248/156, 530, 532, 545; 280/475, 507; 70/58; 52/157

[56] References Cited

U.S. PATENT DOCUMENTS

| | | | |
|---|---|---|---|
| 3,067,846 | 12/1962 | Luebkeman . | |
| 3,238,678 | 3/1966 | Barnett | 280/475 X |
| 3,526,110 | 9/1970 | Foote . | |
| 3,884,055 | 5/1975 | Vuillemot . | |
| 3,953,051 | 4/1976 | Weather . | |
| 4,032,171 | 6/1977 | Allen et al. | 280/507 |
| 4,294,088 | 10/1981 | Barr | 248/552 X |
| 4,459,832 | 7/1984 | Avrea et al. | 280/507 X |
| 4,548,418 | 10/1985 | Wendorff | 248/352 X |
| 4,577,884 | 3/1986 | Harris | 280/507 |
| 4,756,172 | 7/1988 | Weaver | 70/58 |
| 4,778,142 | 10/1988 | Roba | 248/156 X |
| 4,836,570 | 6/1989 | Lopez et al. | 280/507 |
| 4,889,357 | 12/1989 | Perry | 248/352 X |
| 4,920,897 | 5/1990 | Reed et al. | 248/156 X |

*Primary Examiner*—David L. Talbott
*Attorney, Agent, or Firm*—Merchant, Gould, Smith, Edell, Welter & Schmidt

[57] ABSTRACT

A security device (10) for a trailer is provided having a body member (12) with an auger (30) projecting from the body member (12). The auger (30) rotatably anchors the body member (12) to the ground. A plug (40) projects from the body member (12) for insertion into a socket portion (62) of the trailer. A bail (46) surrounds a portion of the socket portion (62) and locks to the body member (12) such that movement of the body member (12) relative to the socket portion (62) is restrained.

7 Claims, 3 Drawing Sheets

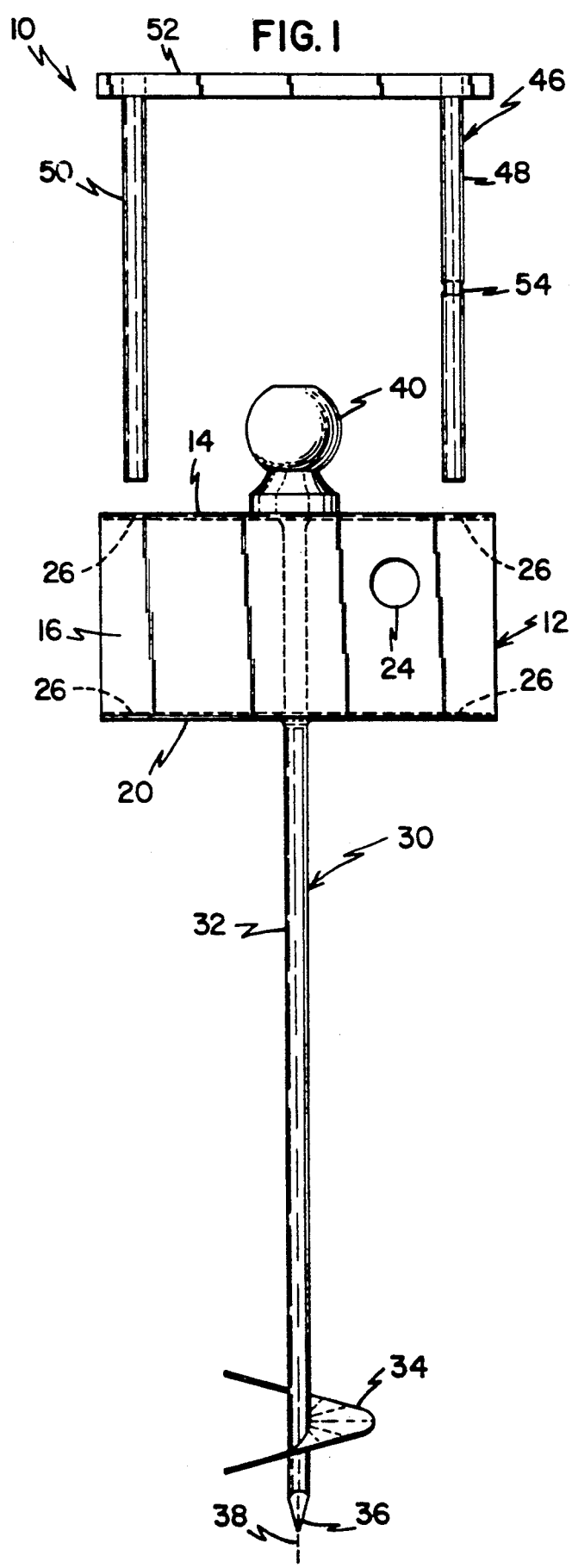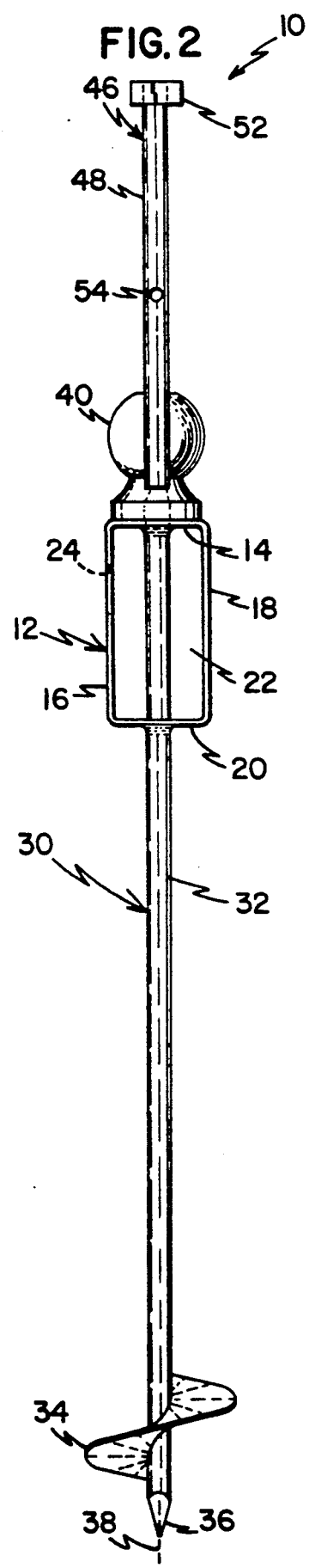

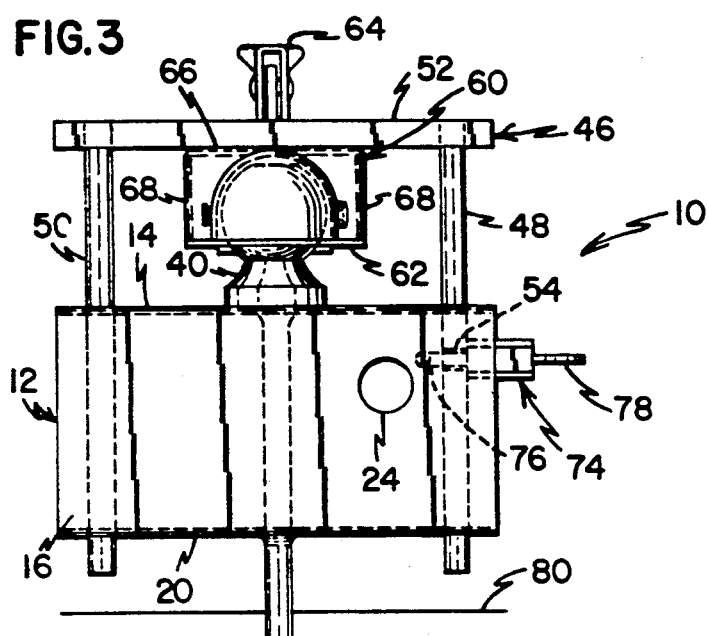
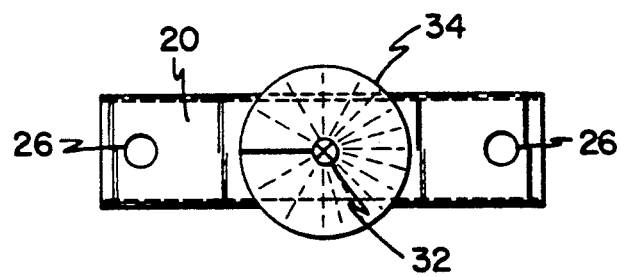
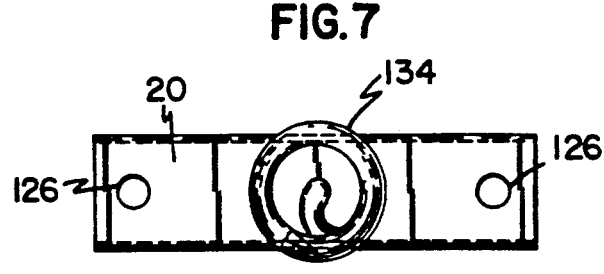

TRAILER SECURITY DEVICE AND METHOD

FIELD OF THE INVENTION

The present invention relates to a trailer security device and method for securably anchoring a trailer to the ground.

BACKGROUND

A wide variety of trailers exist today for towing behind a vehicle. Boat trailers and camper trailers are two types in particular that are quite common. Typically, the trailer has a trailer tongue at a front end of the trailer with a cup-shaped socket portion. To tow the trailer behind the vehicle, the socket portion is placed over a trailer hitch ball attached to the rear of the vehicle.

One significant problem that often arises for trailer owners and trailer users occurs when the trailers are detached from the vehicles and left unattended. Trailers are left unattended in a variety of situations including times when the trailers are left for storage and times when the trailers are left at sites temporarily such as at a campsite. Sometimes trailers are left unattended alongside the road such as occurs when a trailer has a flat tire and must be left while a service station is sought. Unattended trailers are subject to unauthorized towing because the ball and socket arrangement is fairly common and typically has standard dimensions. Anyone having a trailer hitch ball attached to a vehicle usually can place the socket portion of an unattended trailer onto the ball and tow the trailer away.

Some steps taken in the past to secure an unattended trailer against unauthorized removal include attaching the trailer to an immovable object such as a tree with, for example, a chain and padlock. This method, however, always requires the presence of a nearby immovable object that permits a chain to be attached. Another known method to deter unauthorized towing is to employ a device which attempts to disable the socket portion of the trailer by preventing insertion of a trailer hitch ball. One problem with these devices is that they do not prevent movement of the trailer.

It is clear that there has existed a long and unfilled need in the prior art for a trailer security device to prevent unauthorized towing or movement of the trailer that solves these and other problems associated with the prior art.

SUMMARY OF THE INVENTION

The present invention relates to a trailer security device having a body member with structure being provided for anchoring the body member t the ground. In the preferred embodiment, the anchoring structure is an auger which rotates into the ground. In a first preferred embodiment, the auger includes an elongated rod having a screw disk attached at one end of the auger. In a second preferred embodiment, the auger includes an elongated rod having a spiral portion at one end of the rod.

The trailer security device also has structure for facilitating attachment of the body member to a trailer. In the preferred embodiments, the body member is provided with a plug projecting from the body member for insertion into a socket portion of the trailer. Preferably the plug is a conventional trailer hitch ball. The security device is further provided with a bail to cooperate with the plug to attach the body member to the trailer. In the preferred embodiments, the bail includes a bar with at least one arm projecting from the bar to the body member. The bar is positioned to locate the socket portion between the plug and the bar to prevent the trailer from being moved away from, or pulled off, the plug. The arm of the bail is positioned adjacent a side surface of the trailer tongue to restrain rotation of the body member relative to the trailer about an axis defined by the plug to keep the auger from being rotated out of the ground. In the preferred embodiments, the bail includes two parallel arms projecting from the bar which are positioned adjacent opposite side surfaces of the trailer tongue.

In the preferred embodiments, the body member is formed from a plurality of plates defining a chamber in which at least a portion of one of the arms of the bail is positioned after passing through a hole in one of the plates. An aperture in the portion of the arm in the chamber receives an elongate lock member such as a bail arm of a padlock. The bail is restrained from movement away from the body member by the bail arm of the padlock engaging the plate of the body member. Preferably, the bail arm of the padlock is positionable in the chamber to deter cutting of the padlock bail arm with lock cutters.

The present invention also relates to a method of anchoring a trailer to the ground wherein a security device is provided having a plug projecting from a body member and a bail. The body member is attached to the ground preferably by providing an auger projecting from the body member and rotating the auger into the ground. The plug is inserted into a socket portion of a trailer and the bail is placed to surround a portion of the socket portion to restrain movement of the plug relative to the trailer. The bail is locked to the body member to restrain movement of the bail away from the body member.

BRIEF DESCRIPTION OF THE DRAWING

In the drawings, wherein like reference numerals generally indicate corresponding parts throughout the several views:

FIG. 1 is a front view of a first preferred embodiment of a trailer security device according to the present invention;

FIG. 2 is a side view of the trailer security device shown in FIG. 1;

FIG. 3 is a front view of the trailer security device shown in FIG. 1 showing the device securing a trailer to the ground;

FIG. 5 is a bottom view of the body member and auger shown in FIG. 1;

FIG. 7 is a bottom view of the device shown in FIG. 6.

DETAILED DESCRIPTION OF THE PREFERRED EMBODIMENTS

Figure 4:
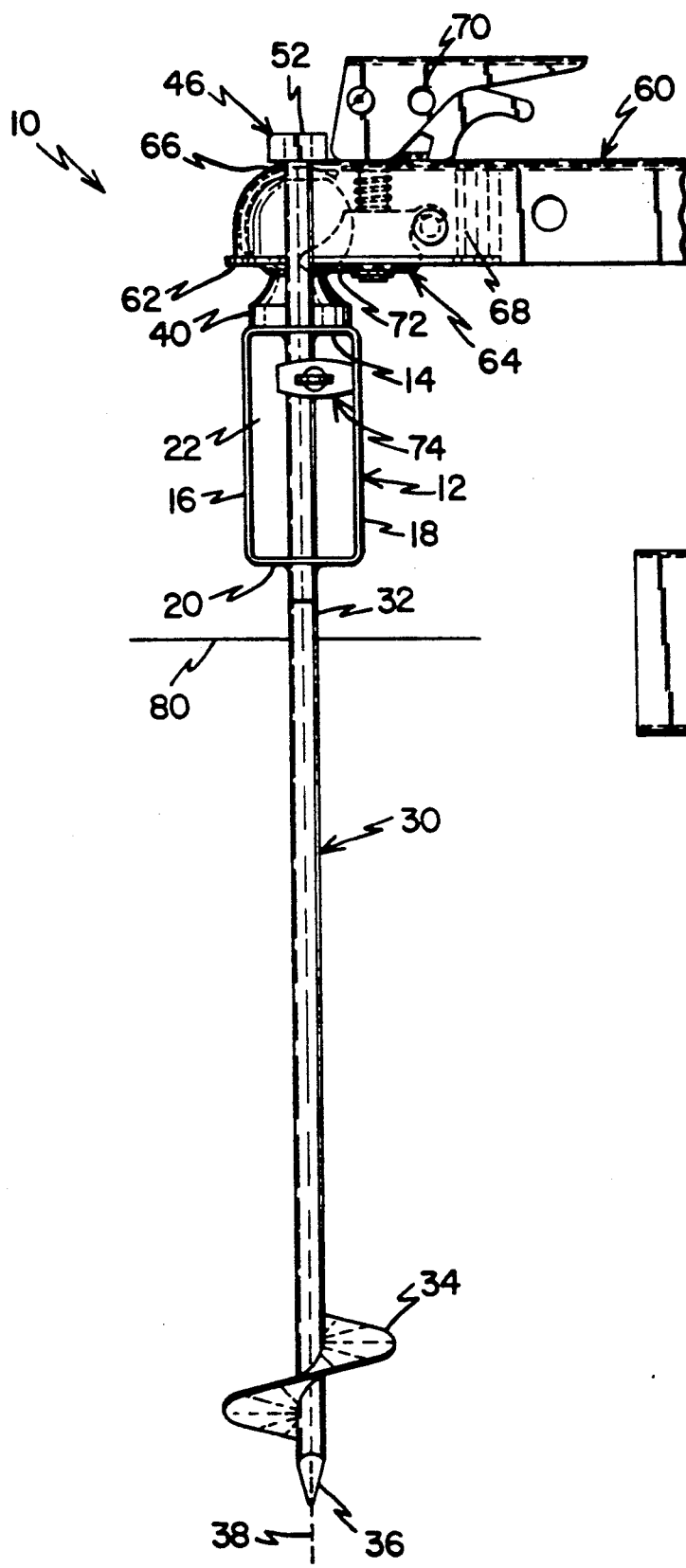
FIG. 4 is a side view of the view shown in FIG. 3.

Referring now to FIGS. 1-5, a first preferred embodiment of a trailer security device or security device 10 is shown. As best shown in FIGS. 1 and 2, the security device 10 includes a body member 12. Structure is provided which projects from the body member 12 which permits attachment or anchoring of the body member 12 to the ground. Structure is also provided on the body member 12 which permits attachment of the body member 12 to a trailer to restrain the trailer from movement relative to the body member 12. As will be discussed below, these structures of the security device 10 cooperate to securely anchor the trailer to the ground.

In the first preferred embodiment, the body member 12 has a box shape formed by a top plate 14, a front plate 16 and a back plate 18 extending from the top plate, and a bottom plate 20 parallel to the top plate 14 connected to the front plate 16 and back plate 18. The plates 14, 16, 18, 20 cooperate to form a chamber 22 having open ends. Preferably, the plates are formed from a material such as metal.

The body member 12 of the first preferred embodiment is provided with an auger 30 to permit attachment of the body member 12 to the ground. The auger 30 is formed from an elongated rod 32 defining a longitudinal axis 38 and having a generally circular cross-sectional shape with a lower end terminating in a sharpened tip 36. A screw disk 34 is mounted to the rod 32 adjacent the lower end of the auger 30. An upper end of the auger 30 passes through an aperture in the bottom plate 20 of the body member 12 and extends up to the top plate 14. Preferably, the rod 32 is made of metal and is welded to both the bottom plate 20 and the top plate 14 of body member 12.

FIGS. 3 and 4 illustrate the first preferred embodiment of the security device 10 attached to the ground, represented by line 80. To attach the body member 12 to the ground 80, the tip 36 is inserted axially into the ground such that screw disk 34 rests on the ground. Next, a force is simultaneously applied to the auger 30 in a direction of the longitudinal axis 38 toward the tip 36 while the auger 30 is rotated about the longitudinal axis 38. The screw disk 34 will move downward into the ground 80 into the position shown in FIGS. 3 and 4. To later remove the auger 30 from the ground 80, the auger 30 is rotated in the opposite direction until the screw disk 34 is no longer beneath the surface of the ground 80. While the auger 30 is in the ground 80, the screw disk 34 effectively resists removal of the auger 30 from being pulled straight out of the ground.

The security device 10 is used to securely anchor a trailer to the ground 80. As best shown in FIGS. 3 and 4, a typical trailer has a trailer tongue 60 provided at a front end of the trailer and having a trailer hitch socket or socket 62. The first preferred embodiment of the security device 10 includes a plug 40 projecting from the body member 12 to facilitate attachment of the body member 12 to the trailer. The plug 40 is provided on the top plate 14 of body member 12 for insertion into the socket 62 of trailer tongue 60. It is anticipated that the plug 40 may have a variety of shapes and still be within the principles of the present invention. In the first preferred embodiment shown, the plug 40 is a conventional metal trailer hitch ball welded to the top plate 14 of the body member 12. During use of the security device 10, the plug preferably projects in a general vertical direction relative to the ground and defines a generally vertical axis.

As shown in FIGS. 1-4, a bail 46 is provided to cooperate with the plug 40 to facilitate attachment of the trailer to the body member 12. The bail has a bar 52 and a first arm 48 extending from the bar. In the preferred embodiment, the bail 46 also has a second arm 50 extending from the bar parallel to the first bar 48. Bail arm holes 26 are provided in the top plate 14 of the body member 12 for receiving the first arm 48 and second arm 50. For added strength, bail arm holes 26 are also provided in the bottom plate 20. Once the socket 62 of trailer tongue 60 has been placed over the plug 40, the bail 46 is placed over the trailer tongue 60 such that the bar 52 is adjacent a top surface 66 of the trailer tongue 60. The first arm 48 and the second arm 50 are positioned adjacent opposite side surfaces 68 of the trailer tongue 60. In this configuration, the bail 46 and body member 12 completely surround a portion of the trailer tongue 60. It is to be appreciated that other trailers may exist where the particular size and shape of the trailer tongue 60 is different from the one illustrated in the Figures. In some trailers, the bail may have to be reconfigured somewhat in order to permit proper positioning of the bail 46 to permit attachment of the trailer to the body member 12.

To attach the bail 46 to the body member 12, an aperture 54 is provided in the first arm 48. Upon insertion of the first arm 48 through the bail arm hole 26 in the top plate 14 such that the aperture 54 is below the top plate with the bar above the top plate, an elongate lock member 76 is lockably positioned in the aperture 54. The elongate lock member 76 has a length greater than a diameter of the hole 26 for first arm 48 in the top plate 14. In the preferred embodiment, the elongate lock member 76 forms a bail arm of a padlock 74. FIGS. 3 and 4 illustrate the padlock 74 having its bail arm pass through aperture 54 to restrain upward movement of the bail 46 from body member 12. A key 78 is shown to unlock padlock 74. Optionally, a guide hole 24 may be provided through the front plate 16 to assist in the operation of inserting the bail arm of padlock 74 through the aperture 54 and placing the padlock 74 in a locked state.

Once the padlock 74 is locked into place, the trailer is securably anchored to the ground with the security device 10. The bar member 52 of bail 46 locates the socket 62 between the plug 40 and the bar member 52 and restrains the trailer tongue 60 from upward, or vertical, movement away from the plug 40. The auger 30 acts to resist being pulled straight out of the ground. Should the auger 30 and body member 12 be rotated about the longitudinal axis 38 relative to the trailer tongue 60 in an effort to rotate the auger out of the ground, one or preferably both of the bail arms 48, 50 will engage the side surfaces 68 of the trailer tongue 60, restraining rotational movement. Further, the bail arm of padlock 74 is preferably located substantially within the chamber 22 of body member 12 and the chamber 22 preferably has an appropriate size such that the bail arm is protected from being cut by bolt or lock cutters.

Figure 6:
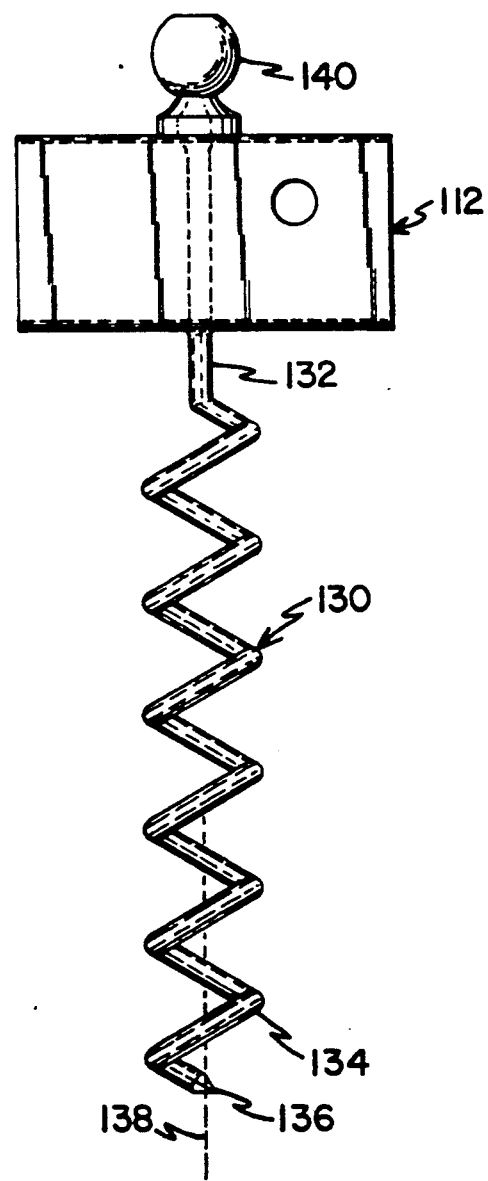
FIG. 6 is a front view of a second preferred embodiment of a body member and an auger of a trailer security device.

FIGS. 6 and 7 illustrate a second preferred embodiment of an auger 134 which can be used in place of auger 30. The body member 112 is basically identical to body member 12. As shown in FIGS. 6 and 7, the body 112 includes a plug 140 and a plurality of guide holes 126 passing through the plates of the body member 112. The auger 130 is slightly different and is formed from an elongated rod 132 having a generally circular cross-sectional shape with a lower end formed into an elongated corkscrew or spiral portion 134 defining a longitudinal axis 138. The spiral portion terminates in a sharpened tip 136. As in the first preferred embodiment, an upper end of the auger 130 is attached to the body member 112.

To attach the body member 112 of the second preferred embodiment to the ground, the tip 136 is placed against the ground and then a downward force is applied while rotating the auger 130 and body member 112. Once the spiral portion 134 is sufficiently into the ground, the spiral portion acts to resist being pulled straight out of the ground. It is to be appreciated that various other structures projecting from the body members 12, 112 could be provided which securably anchor the body members 12, 112 to the ground.

The security devices described above are particularly useful in securably anchoring a trailer to the ground to prevent unauthorized removal of the trailer. The security device 10 may also provide some stability to a trailer during high winds which may ordinarily overturn the trailer. The security device 10 may be employed by the trailer owner or trailer user anytime it is desirable to secure the trailer to the ground. As noted above, the augers 30, 130 are removable from the ground when the bail is unlocked from the body member such that the trailer owner or user can transport the security device 10 with the trailer to a new location should it be desirable to anchor the trailer to the ground at the new location.

Depending upon the needs of the trailer owner or user, the security device 10 may be permanently left anchored to the ground while the trailer is detached from the security device 10. To more securely anchor the security device 10 to the ground in those circumstances, the lower end of the augers 30, 130 can be set in concrete. One method of accomplishing this is to dig a hole in the ground, fill the hole with concrete, and then, before the concrete sets, screw the augers 30, 130 into the concrete and let dry. Once dried, the augers 30, 130 cannot be unscrewed.

When the body members 12, 112 are anchored to the ground, such as with concrete, such that rotation of the auger 30, 130 is effectively prevented, the structure for facilitating attachment of the body members 12, 112 to the trailer may be modified slightly. Since rotation of the body member is restrained by the concrete, the first and second arms 48, 50 of bail 46 do not have to be present to engage the side surfaces 68 of the trailer tongue 60. Other structure besides arms 48, 50 may be provided to position bar 52 to locate the top surface 66 of the trailer tongue 60 between plug 40 and bar 52, and restrain vertical movement of bar 52 away from plug 40.

As shown in FIGS. 3 and 4, a latch mechanism 64 is typically provided on the trailer tongue 60 to securely attach the socket 60 to a trailer hitch ball. The latch mechanism 64 is primarily used to prevent the trailer from becoming detached from the vehicle during the normal towing operation. The latch mechanism 64 has a claw portion 72 which is positionable around a base of the trailer hitch ball. A padlock may be locked through hole 70 to deter removal of the trailer from the trailer hitch ball.

As noted above, the latch mechanism 64 is not an element required to securably anchor the trailer to the ground with the trailer security device 10 in the preferred embodiments. In the first and second preferred embodiments, the bar 52 of bail 46 cooperates with either of the body members 12, 112 and the plugs 40, 140 to restrain relative vertical movement of the trailer tongue 60 away from the plugs 40, 140. However, it is to be appreciated that the latch mechanism 64 could be employed to restrain movement of the trailer tongue 60 away from plugs 40, 140 in place of bar 52. Unlike the first and second preferred embodiments though, a padlock placed through hole 70 to securely attach the trailer to the security device 10 is exposed to being cut by bolt cutters. If the latch mechanism 64 is employed, however, structure such as one or both of the arms 48, 52 can be provided to engage the side surfaces 68 of trailer tongue 60 to prevent rotational movement of the augers 30, 130 out of the ground. Should rotation be effectively prevented by other structure, such as placing the augers 30, 130 in concrete, arms 48, 50 need not be present either.

It is to be understood, that even though numerous characteristics and advantages of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad, general meaning of the terms in which the appended claims are expressed.

What is claimed is:

1. A trailer security device for locking an unattended trailer to the ground, the trailer including a trailer tongue having a trailer hitch socket adapted to receive a trailer ball of a vehicle during a towing operation, the trailer security device comprising:

(a) a body member;
   (b) an auger projecting from the body member, the auger rotatably securing the body member to the ground;
   (c) a plug projecting from the body member, the plug being adapted for insertion into the trailer hitch socket of the trailer when the trailer is not attached to the trailer hitch ball of the vehicle;
   (d) a generally U-shaped bail lockable to the body member after the plug is inserted into the trailer hitch socket, the bail including a bar portion and opposing arm portions extending from the bar portion at opposite ends of the bar portion, the bail cooperating with the body member to completely surround a portion of the trailer tongue adjacent the trailer hitch socket; and
   (e) means for locking the bail to the body member, wherein the trailer tongue is prevented from being lifted off of the plug by the engagement of the bar portion of the bail with the trailer tongue, and wherein the auger is prevented from being rotated out of the ground by the engagement of the arm portions of the bail with the trailer tongue.

2. The trailer security device of claim 1, wherein the body member includes a top plate, a bottom plate, a front plate, and a back plate, the front plate and the back plate connecting the top plate to the bottom plate at a spaced apart distance to form an internal chamber, the top plate and the bottom plate each having first and second holes passing through the top plate and through the bottom plate, the auger projecting from the bottom plate and the plug projecting from the top plate, the first holes in the top plate and the bottom plate receiving one of the arm portions of the bail, the second holes in the top plate and the bottom plate receiving the other arm portion of the bail, at least one of the arm portions including an aperture positioned in the internal chamber between the top plate and the bottom plate and between the front plate and the back plate, and wherein the means for locking includes a lock member received by the aperture in the arm portion of the bail, wherein the lock member has a dimension greater than the first hole in the top plate, and wherein the lock member is engageable with the top plate of the body member to lock the bail to the body member.

3. The trailer security device of claim 2, wherein the lock member forms a bail arm of a padlock.

4. The trailer security device of claim 1, wherein the auger includes an elongated rod having a portion with an elongated spiral shape.

5. The trailer security device of claim 1, wherein the auger includes an elongated rod having a linear portion with a screw disk attached to the linear portion.

6. The trailer security device of claim 1, wherein the plug includes a trailer hitch ball.

7. A method of locking an unattended trailer to the ground comprising the steps of:
(a) providing a trailer security device including:
  (i) a body member;
  (ii) an auger projecting from the body member;
  (iii) a plug projecting from the body member; and
  (iv) a generally U-shaped bail lockable to the body member;
(b) rotating the auger into the ground to anchor the body member to the ground;
(c) inserting the plug into a trailer hitch socket of the trailer;
(d) placing the bail to surround a portion of the trailer hitch socket; and
(e) locking the bail to the body member to prevent the trailer hitch socket from being lifted off the plug and to further prevent the auger from being rotated out of the ground thereby locking the unattended trailer to the ground.

* * * * *